United States Patent Office

3,629,391
Patented Dec. 21, 1971

3,629,391
METHOD FOR DIAGNOSING DIABETES
Richard L. Fenichel, Wyncote, and Harvey E. Alburn, West Chester, Pa., assignors to American Home Products Corporation, New York, N.Y.
No Drawing. Original application Jan. 23, 1967, Ser. No. 610,739, now Patent No. 3,475,534, dated Oct. 28, 1969. Divided and this application Apr. 28, 1969, Ser. No. 847,749
Int. Cl. G01n 31/00
U.S. Cl. 424—9
1 Claim

ABSTRACT OF THE DISCLOSURE

Compositions containing reduced insulin B chains complexed with albumin have hyperglycemic activity and are useful in the treatment of hyperinsulinism, to screen substances which are useful in the treatment of diabetes and to diagnose diabetic and prediabetic states in animals.

This is a division of application Ser. No. 610,739, filed Jan. 23, 1967 and now U.S. Pat. No. 3,475,534.

SUMMARY OF THE INVENTION

This invention relates to compositions for, and means to treat, hyperinsulinism. More particularly, it is concerned with the administration of a complex of reduced insulin B chains with albumin to warm-blooded animals suffering from hyperinsulinism to secure symptomatic relief in cases of insulin overdosages or in situations wherein the body supplies too much insulin for the subject's normal needs. The instant compositions are also useful in screening and selecting therapeutic substances effective in the treatment of diabetes, and as diagnostic aids in determining whether diabetic or prediabetic conditions exist in individuals.

BACKGROUND OF THE INVENTION

Hyperinsulinism occurs under many circumstances. Pancreatic islet cell adenoma, pancreatic islet cell carcinoma and diffuse hyperphasia of islet cells are the most dramatic conditions that produce frank hyperinsulinism. These insulin secreting tumors are met in all age groups and even in veterinary medicine. Mild hyperinsulinism, moreover, occurs in individuals with hypertension. In addition, stress and emotional disturbances produce a symptom complex resulting in fatigue in which hyperinsulinism is an outlet mechanism. Increased intestinal hormone secretion of secretin and pancreazymin also augment insulin release.

In hyperinsulinism, the blood sugar falls and the symptoms are the result of hypoglycemia. Thus patients suffering from hyperinsulinism can exhibit the following symptoms: sweating, pallor, flushing, salivation, tachycardia, anxiety, confusion, irritability, negativism, dullness, excitement, violence, stammering and other speech disorders, diplopia, nystagmus, anisocoria, tremor, transient paralysis, positive Babinski sign, alphasia, incoordination, twitching, convulsions, epigastric "sinking" sensation, hunger, increase in hunger contractions in blood sugar levels down to 75 mgm. percent, gastric atony below that level, occasional vomiting, slight rise in blood pressure, anginal pain in patients with damaged myocardium, and the like. The hypoglycemia syndrome, if untreated, terminates in coma and death. Thus, it is clear that the availability of a specific anti-insulin agent would be of great value to directly and immediately combat hyperinsulinism.

There is also a well known and clearly felt need to provide chemical agents useful to treat diabetes, especially those which are effective orally, to replace insulin. Insulin suffers from shortcomings including the need to isolate it from animal organs, the need to keep it cold so that loss in potency does not occur, the need to administer it by the painful injection route, and the like. The selection of chemical agents useful to treat diabetes would be facilitated by a rapid, inexpensive and convenient screening method and the instant compositions lend themselves to use in such screens.

There also exists a need to provide means to diagnose diabetes and prediabetes in suspected individuals. This would provide an additional aid to diagnosticians who now rely on measurements of blood sugar or urine sugar. It is a matter of common knowledge and experience that individuals often are hyperglycemic without being diabetic. Thus among the more common non-diabetic causes of sugar in the blood or urine there are cases of true renal glycosuria (which is harmless and hereditary), renal glycosuria associated with a more extensive tubular dysfunction, and even temporary alimentary or starvation glycosuria. Furthermore, there is now recognized in certain individuals a condition known as "prediabetes." Here, certain changes are occurring in various body tissues despite normal diagnostic tests. These will later develop into the classic diabetic degenerative vascular processes, but the condition goes unrecognized, usually, because pre-diabetes occurs in advance of detectable blood sugar abnormalities. Thus, a means to detect diabetes and to distinguish its symptoms from non-diabetic glycosurias and to detect pre-diabetes, would clearly be welcome.

It is, accordingly, a principal object of this invention to provide a means to relieve hyperinsulinism which is particularly effective, non-toxic and characterized by high levels of activity for extended periods of time. A further object is to provide novel hyperglycemic dosage forms with anti-insulin activity which are particularly effective, non-toxic and characterized by high levels of activity for extended periods of time. Still another primary object of the instant invention is to provide novel and efficient means to screen and select therapeutic substances with anti-diabetic activity. Yet another principal object of this invention is to provide means to assist in the diagnosis of diabetes and prediabetes in suspected individuals.

DESCRIPTION OF THE INVENTION

These objects are realized by use of a composition which is, in essence: a hyperglycemic composition with anti-insulin activity comprising a complex of reduced insulin B chain polypeptide with albumin and a pharmaceutical carrier, said composition being in injectable dosage unit form.

The therapeutic means of this invention, broadly stated, is a method for the treatment of a warm-blooded animal suffering from hyperinsulinism which comprises administering to said animal a composition as contemplated hereinabove, the quantity of the said complex administered being sufficient to alleviate the hyperinsulinism.

The screening means contemplated by this invention is, in essence, a method for screening and selecting therapeutic substances effective to treat diabetes, which comprises introducing said substance into a system including insulin and a complex of reduced insulin B chain with albumin and determining whether said substance blocks the inhibition, in vitro or in vivo, of insulin by said complex, those substances blocking said inhibition being selected.

The diagnostic means contemplated by this invention is, in essence, a method for diagnosing diabetic or prediabetic conditions in warm-blooded animals which comprises administering a composition comprising a complex of reduced insulin B chain polypeptide with albumin and a pharmaceutical carrier to the suspected diabetic or prediabetic animal and measuring the blood sugar rise, reporting as positive those suspects in which the blood sugar rise is substantially greater than that induced by administering said complex to non-diabetic or non-prediabetic control animals.

The medicament complex employed in the compositions and methods of this invention comprises a reduced insulin B chain polypeptide associated with albumin. As is well known to those skilled in the art, insulin is a protein, each molecule of which is a tetramer. Each of the four monomers, in turn, comprises two polypeptide chains linked to each other by disulfide bridges between cysteine residues in adjacent chains. These polypeptides are of two types, named A and B, respectively, one of each being present in each monomer of the hormone. Not only is the amino acid composition of these peptide chains known, but the sequence in which they occur has been determined. Furthermore, it is easily possible to separate the A and B chains by known methods and procedures for this will be fully described hereinafter. The term "albumin" contemplates a chemical compound, protein in nature. These yield only amino acids upon cleavage with enzymes or acids. Illustrative albumins useful in this invention are grain, albumin, ovalbumin, soybean albumin, serum albumin, lactalbumin, and the like. Especially useful because of its high activity and purity is crystalline bovine albumin, readily available from numerous commercial sources. The term "reduced" when used in association with insulin B chains herein and in the appended chains contemplates a product obtained by treating the B chains, preferably in their S-sulfo form, with a reducing agent, preferably and conveniently, a combination of cysteine and [tris (hydroxymethyl) aminomethane hydrochloride] hereinafter called "tris" in accordance with usage well established in the art. As will be fully described hereinafter, the complex of reduced insulin B chain polypeptide with albumin is prepared by mixing solutions of the reduced insulin B chain polypeptide with appropriate quantities of albumin, preferably at a temperature of about 70° F., and preferably to make a concentration of about 1 mg. of albumin per 1 mg. of reduced B chain. Appropriate quantities of albumin include at least about 0.1 part of albumin per 1 part of reduced B chain as a lower limit. With respect to an upper limit; this is not critical; a large relative amount of albumin can be used, for example, 100 parts per part by weight of reduced B chain will function, but there is no advantage in using this much.

The instant compositions can be administered in a variety of injectable dosage forms. As with insulin, the route of administration determines the duration and rapidity of action. Patients are given injections aseptically by the subcutaneous route, but in coma intravenous or intramuscular injections would be employed to insure rapid action. In large (70 kg.) animals, a convenient site of subcutaneous administration is the thigh.

The daily dose requirements vary with the particular composition being employed, the severity of the symptoms being presented, and the warm-blooded animal being treated. The dosage also varies with the size of the patient. The ordinarily effective dose is from about 0.01 mg./kg. to about 1.0 mg./kg. per day, preferably about 0.14 mg./kg. Of course, as in the case with insulin, each patient requires individual study by the physician to determine the most efficacious time, number, and amount of individual daily doses. As with insulin, blood sugar and urine sugar estimations provide a guide for therapy with the instant compositions, the therapeutic objective in the case of the instant anti-insulin compositions being to raise the blood level to normal levels and then to maintain it.

For unit dosages the instant complexes are compounded into a variety of largely aqueous injectable dosage forms containing various electrolytes, buffers, stabilizers and the like. Thus, for example, the aqueous suspension of the complex can contain sodium chloride, sodium acetate, methyl para-hydroxybenzoate, glycerin, dibasic sodium phosphate, small stabilizing amounts of phenol, metacresol and the like. An especially useful dosage unit comprises sterile water as the carrier, each milliliter of which contains 1 mg. of reduced B chain complexed with 1 mg. of albumin, 1 mg. of cysteine and 3 mg. of tris.

For use in screening and selecting therapeutic substances with antidiabetic activity, the instant complexes are formulated and embodied in in vitro and in vivo systems by standard techniques, illustrations of which will be fully described hereinafter.

For use as diagnostic aids, the instant complexes are injected into the suspected animals at dose levels in the range specified hereinabove. The elevation in blood sugar is measured by techniques familiar to those skilled in the art (for example, the procedure of Hoffman, J. Biol. Chem., 120, 51, 1937 can be used). Diabetics and prediabetics respond to a dose of the complex with a substantially greater rise in blood sugar than do controls. For example, it is not unusual to find approximately double the blood sugar rise in diabetic and prediabetic animals after administration of the instant complex than that seen after administration of the complex to normal control animals.

PREFERRED EMBODIMENTS OF THE INVENTION

The following examples are intended to describe two means to obtain the instant medicament compositions in forms fully satisfactory for use in the methods of this invention. They are merely illustrative and are not to be construed to limit the claim in any manner whatsoever.

EXAMPLE 1

The S-sulfo form of the A and B insulin chains are prepared by reacting crystalline bovine insulin with a sodium sulphite-cupric sulphate-urea reagent according to the procedure of Dixon and Wardlaw (Nature 187:721–724, 1960). The urea that precipitates with the A and B chains of insulin upon addition of ethanol is removed from the preparation by dialysis before lyophilization of the insulin chains. A chains are separated from B chains by solubilization of the chain mixture in pH 7.4, 0.2 M tris [tris(hydroxymethyl) - aminomethane - hydrochloride] buffer, mechanical dialysis of this solution against distilled water, and subsequent adsorption on cross-linked dextran of the solution to remove the major portion of the insulin S-sulfo A chains. The solution containing the insulin S-sulfo B chains is then lyophilized.

The insulin S-sulfo B chains are initially solubilized in pH 3.5 urea formate buffer and are then reduced in 1 mg./1 ml. aliquots in pH 8.6, 0.02 M tris–0.0062 M cysteine buffer by heating for 2 minutes in a near boiling hot water bath. The mitochondrial swelling activity of $5\times10^{-6}$ M bovine crystalline insulin (0.9 mg./5 ml.) is markedly inhibited by this reduced insulin B chain complexed with an equal weight of bovine crystalline albumin (1 mg. of each in 5 ml. test system).

EXAMPLE 2

S-sulfo A and B chains of crystalline insulin are prepared according to the procedure of Dixon and Wardlaw (Nature 188:722, 1960). After a cross linked polystyrene cation exchange resin column treatment and separation of the A and B chains has been accomplished, removal of urea is effected by dialysis of the solution with agitation for 3 hours against 4 changes (13 l.) each of cool (18° C.) distilled water. The solutions are then shell frozen and lyophilized.

S-sulfo B chains, prepared as above are reduced in 0.0062 M cystein–0.02 M tris solution at a concentration of 1 mg./ml. of solution, at pH 8.6, by heating the 1 ml. aliquots in a near boiling water bath for 2 minutes. Immediately after the reduced B chains have cooled to 70° F., crystalline bovine albumin is added so that concentration of 1 mg. per ml. of albumin is present for each mg. of reduced B chain.

The reduced B chain-albumin complex is then dialyzed against pH 8.6, 0.125 M KCl–0.02 M tris solution at a 40:1 gradient for 1¾ hours.

One milligram of dialyzed reduced insulin B chain complexed with 1 mg. of crystalline bovine albumin in 5 ml. of 0.125 M KCl–0.02 M tris solution at pH 7.3, effectively inhibits the mitochondrial swelling of $5\times10^{-6}$ M bovine crystalline insulin (0.9 mg. in 5 ml. test system).

In the preliminary evaluation of the hyperglycemic compositions and methods of this invention, and as a proof of their valuable activity, the in vivo effect of reduced insulin B chain complexed with bovine crystalline albumin is determined in 200 g. normal male Sprague Dawley rats maintained on a standard balanced diet, but fasted 18 hours prior to the experiment. Reduced B chain complexed with an equal weight of bovine crystalline albumin in 0.5 ml. of 0.0124 M cysteine–0.02 M tris reducing solution (2 mg. of each per ml.) is injected intraperitoneally. A control solution consisting of the reducing solution containing the same concentration of bovine crystalline albumin as the experimental reduced B chain solution is administered to a control group of rats. A control blood sample (0.1 ml.) and samples 15 minutes, 30 minutes, 90 minutes, 150 minutes and 210 minutes after injection are obtained by external heart puncture under light ether anaesthesia. An experimental group of rats receiving the reduced B chain-albumin complex by the intravenous route is also included in this experiment. Blood samples are analyzed for glucose content in the procedure of Hoffman (J. Biol. Chem. 120:51, 1937).

Blood glucose elevation above the control values is observed 15 minutes after intraperitoneal or intravenous administration of the reduced B chain albumin complex. A further blood glucose increase above the control values is observed for both experimental groups 30 minutes after injection. A decline in blood sugar is observed 90 minutes after the injection of reduced B chain-albumin for both experimental groups, but these blood glucose levels are still greater than the control values. The increase in blood sugar values for both experimental groups above the control blood sugar values persists throughout the experiment.

A second type of in vivo experiment is utilized using normal male Sprague Dawley rats maintained on a standard, balanced diet in order to obtain a sustained increase in blood sugar with administration of reduced B chain complexed with albumin.

After an 18 hour fast, the animals are injected intraperitoneally with 1 ml. of 0.0062 M cysteine–0.02 M tris solution at pH 8.6–8.9 containing either 1 mg. of reduced B chain plus 1 mg. of albumin, or albumin alone. A second injection of either the same amount of reduced B chain and albumin, or albumin alone is given after the 30 minutes blood sample is obtained. Blood samples (0.1 ml.) are taken from the heart under light ether anaesthesia before the first injection and 30, 60 and 90 minutes thereafter. Blood glucose levels are determined as above. Under these conditions the peak elevation of blood glucose of the reduced B chain-albumin injected rats over that of the controls persists for 1 hour as indicated by the 30 and 60 minute blood glucose values, before falling off at 90 minutes.

Methods for preparation of systems to screen and select, in vivo and in vitro, therapeutic substances for antidiabetic activity are described in the following examples:

EXAMPLE 3

Rat liver mitochondria are prepared in 0.25 M sucrose solution containing 0.001 M ethylenediamine tetraacetic acid-disodium ethylenediaminetetraacetate (Judah, BioChim. Biophys. Acta. 53:375, 1961) using the differential centrifugation procedure of Schneider (J. Biol. Chem. 176:259, 1948) The effect of a $5\times10^{-6}$ M concentration of insulin in the presence of reduced and dialyzed B chain albumin complex (0.9 mg. of each) and a selected concentration of a test compound on mitochondrial swelling, in which the mitochondria are suspended in 0.125 M KCl–0.02 M tris–0.1% partially hydrolyzed gelatin solution at pH 7.3, (solution A) is measured by following changes in light absorption at 520 m$\mu$ with a Beckman Model B Spectrophotometer (Lehninger, A. L., J. Biol. Chem. 234:2187, 1959). The insulin, reduced and dialyzed B chain-albumin complex and selected concentrations of compound are solubilized in 5 ml. of Solution A.

Controls are run using insulin, reduced B-chain-albumin plus compound, compound alone, and insulin plus reduced B-chain-albumin. The reduced B chain-albumin blocking of the mitochondrial swelling activity of insulin is alleviated by the compound under study if the swelling observed in the presence of the compound is greater than the swelling observed in its absence and the compound is reported as active. The extent of the activity of the compound is gauged by the concentration at which the system approaches the swelling activity of insulin alone.

EXAMPLE 4

Male Sprague Dawley rats weighing 170–200 g. are fed ad libitum for one week on a high fat, high protein diet of the following composition:

| | G. |
|---|---|
| Casein, high nitrogen | 315 |
| Vegetable oil, hydrogenated | 620 |
| Salt U.S.P. XIV | 62 |
| B vitamins | 1 |
| Choline chloride | 2 |
| | 1000 |

After one week the rats weigh between 180 and 200 g. The effect of reduced insulin B chain-albumin complex on blood glucose levels is determined after the rats have been fasted 18 hours prior to the experiment. After obtaining an initial 0.1 ml. blood sample from the heart by external heart puncture under light ether anaesthesia the rats are given 0.5 ml. of a solution or a suspension of a compound under test by intraperitoneal injection. The compound is solubilized in physiological saline, or a suitable buffer or suspended, for example, in carboxymethyl cellulose. After 10 minutes the animals receive 1 ml. of a 1 mg./ml. solution of reduced insulin B chain-albumin complex in 0.02 M tris–0.0062 M cysteine reducing solution pH 8.6 (5 mg./kg.). A second intraperitoneal injection of reduced B chain-albumin (5 mg./kg.) is given to these animals after obtaining a 30 minute blood sample. Additional 0.1 ml. blood samples are obtained 60 and 90 minutes later. Control animals treated in the same way as the experimental animals receive 1 ml. of 0.0062 M cysteine–0.02 M tris (hydroxymethyl)aminomethane hydrochloride solution containing 1 mg./ml. of crystalline bovine albumin instead of the reduced B chain-albumin complex. Blood glucose values were determined by the procedure of Hoffman, cited hereinabove.

Additional control groups of rats receiving the reduced B chain-albumin complex in reducing solution, or albumin alone in reducing solution, and 0.5 ml. of physiological saline in the place of compound under test are also included. The activity of a compound is determined by the extent that it is able to prevent or alleviate the reduced B chain-albumin induced hyperglycemia. Those compounds which block the inhibition of insulin by the reduced B chain-albumin complex are reported as positive.

EXAMPLE 5

To diagnose diabetes and prediabetes the in vivo test procedure of Example 2 (second type) is repeated with male Sprague-Dawley rats. Those with diabetes and with prediabetes, and those maintained for 7 days on the high fat-high protein diet of Example 4 (which mimics the conditions of starvation diabetes) elicit about twice the blood glucose elevation observed in the normal diet, non-diabetic and non-prediabetic control animals at 30 and 60 minutes after administration of the complex and show a slower fall of glucose elevation 90 minutes after administration of the complex.

We claim:
1. A method for the diagnosis of diabetes in a warm blooded animal suspected of being a diabetic or pre-diabetic, which comprises: administering by injection to said animal a composition comprising (a) complex of a reduced S-sulfo form of the insulin B chain polypeptide with from 0.1 part to about 100 parts by weight of an albumin selected from the group consisting of grain albumin, ovalbumin, soybean albumin, serum albumin and lactalbumin per part by weight of said polypeptide and (b) a pharmaceutical carrier, the amount of ingredient (a) in said composition being sufficient to impart a blood glucose rise in a non-diabetic warm blooded animal whereby the blood sugar rise in a diabetic or pre-diabetic subject is about twice the blood glucose elevation obtained in an identically treated non-diabetic subject.

References Cited

Lowy et al.: The Lancet, 1961, pp. 802–804.
Wilson et al.: Biochemica et Biophysica Acta., 1962, 62, pp. 483–489.

JEROME D. GOLDBERG, Primary Examiner